(12) United States Patent
Florentino et al.

(10) Patent No.: US 11,960,619 B1
(45) Date of Patent: Apr. 16, 2024

(54) SYSTEM FOR INTRAFIRM TRACKING OF PERSONALLY IDENTIFIABLE INFORMATION

(71) Applicant: Morgan Stanley Services Group Inc., New York, NY (US)

(72) Inventors: Christopher Florentino, New York, NY (US); Graham Coull, London (GB); Helen Le, London (GB); Damien Moore, Edinburgh (GB)

(73) Assignee: Morgan Stanley Services Group Inc., New York, NY (US)

( * ) Notice: Subject to any disclaimer, the term of this patent is extended or adjusted under 35 U.S.C. 154(b) by 292 days.

(21) Appl. No.: 16/686,311

(22) Filed: Nov. 18, 2019

(51) Int. Cl.
*G06F 21/62* (2013.01)

(52) U.S. Cl.
CPC .................. *G06F 21/6245* (2013.01)

(58) Field of Classification Search
CPC .................................................. G06F 21/6245
See application file for complete search history.

(56) References Cited

U.S. PATENT DOCUMENTS

| 9,288,184 | B1 | 3/2016 | Kvamme et al. |
| 2005/0044409 | A1 | 2/2005 | Betz et al. |
| 2007/0250913 | A1 | 10/2007 | Betz et al. |
| 2017/0206376 | A1 | 7/2017 | Sher-Jan |
| 2017/0270318 | A1* | 9/2017 | Ritchie ............... G06F 21/6245 |
| 2017/0286717 | A1 | 10/2017 | Khi et al. |
| 2017/0344754 | A1* | 11/2017 | Kumar ................. H04M 3/5175 |
| 2018/0075138 | A1 | 3/2018 | Perram et al. |
| 2018/0247076 | A1* | 8/2018 | Lerner ................ G06F 21/6263 |
| 2018/0276401 | A1* | 9/2018 | Allen .................. G06F 21/6245 |
| 2019/0138734 | A1* | 5/2019 | Sher-Jan ............... G06F 21/577 |
| 2020/0175094 | A1* | 6/2020 | Palmer ................. G06F 16/353 |
| 2020/0250139 | A1* | 8/2020 | Muffat ............... G06V 30/1988 |
| 2023/0306429 | A1* | 9/2023 | Shachar ................. G06N 20/00 |

\* cited by examiner

*Primary Examiner* — Harris C Wang
(74) *Attorney, Agent, or Firm* — K&L Gates LLP (57) ABSTRACT

A computer-implemented system and method for tracking use of personally identifiable information by a computer asset of a firm. The method includes receiving one or more data elements associated with the computer asset, receiving an individual type associated with the one or more data elements, and determining whether the one or more data elements individually or as a combination constitute PII. In response to determining that the data elements constitute PII, the method includes determining whether enhanced data controls are necessary for the computer asset according to the one or more data elements that constitute the PII, determining a sensitivity of the PII, and recording the individual type, whether enhanced data controls are necessary, and the sensitivity of the PII in association with the computer asset in a database communicably coupled to the computer system.

34 Claims, 5 Drawing Sheets

SYSTEM FOR INTRAFIRM TRACKING OF PERSONALLY IDENTIFIABLE INFORMATION

BACKGROUND

The rights and responsibilities regarding the use of clients', employees', and third parties' personally identifiable information (PII) by firms is governed internationally by a number of different regulatory regimes. Therefore, any firm that is operating in multiple jurisdictions must be prepared to demonstrate compliance with each of these various regulatory regimes to both private individuals seeking to assert their rights to their PII and the regulatory bodies in these jurisdictions. However, tracking the internal use of PII can be challenging for large firms that have hundreds, if not thousands, of internal systems that each may be using data that could, either alone or in combination with other data utilized by the firm, constitute PII and may be storing the data in different formats that may not necessarily be compatible. Therefore, there is a need for systems that are able to track the use of PII across all of a firm's internal systems, regardless of the form or format in which the PII may be utilized by the internal systems.

SUMMARY

In one general aspect, the present invention is directed to computer systems and computer-implemented methods for tracking use of personally identifiable information (PII) by a computer asset of a firm. The method comprises, in various embodiments, receiving, by a computer system, (i) one or more data elements associated with the computer asset and (ii) an individual type associated with the one or more data elements. Then, the computer system determines whether the one or more data elements individually or as a combination constitute PII. Upon a determination that the one or more data elements constitute PII, the computer system can (i) determine whether enhanced data controls are necessary for the computer asset according to the one or more data elements that constitute the PII; (ii) determine a sensitivity of the PII; and (iii) record the individual type, whether enhanced data controls are necessary, and the sensitivity of the PII in association with the computer asset in a database communicably coupled to the computer system.

Various aspects of the present invention can provide several benefits of existing computer system, including automatically identifying the utilization of PII within a firm, assisting in the consistent application of the complex rules that dictate the use of PII in compliance with a number of different jurisdictions' regulatory regimes across an entire firm, and providing an audit trail to allow the firm to accurately and efficiently respond to audits from individuals and different jurisdictions' data protection regulatory bodies. Further, various aspects of the present invention can provide a number of different technical solutions to technical problems inherent with firms' monitoring and management of clients', employees', and third parties' PII for compliance with various jurisdictions' regulations. In particular, the systems and processes described herein can improve firms' internal PII compliance systems by automating the collection of data elements being utilized by the firms' computer assets and supplementing automatically discovered data elements with the knowledge of the individuals responsible for managing the computer assets to leverage both automated computer discovery and human knowledge. Further, the systems and processes described herein are programmed to algorithmically determine the classification of any PII being utilized by the computer asset, calculate PII usage by the computer asset, and calculate the sensitivity of the PII, which allows complex PII classification rules that are based on compliance with a number of different regulatory regimes to be applied across the entire firm in a consistent manner. Further, the systems and processes create an inventory of which PII is utilized by the firm, what assets are utilizing particular PII, and how the assets are utilizing the PII in a single compliance system, which allows firms to efficiently respond to audits from regulatory agencies, individuals' personal data deletion requests, and other inquiries. Further, the systems and processes allow the firm's assets to be individually tailored to relevant jurisdictional controls, which is a major benefit because of the wide-ranging differences in the requirements imposed on firms handling PII in different jurisdictions.

These and other potential benefits realizable with the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description taken in conjunction with the accompanying drawings as follows.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and not to limit the scope thereof.

The use of PII by firms and individuals' rights associated with their own PII are governed by a number of different regulatory regimes in different jurisdictions. For example, Japan has the Act on the Protection of Personal Information, the European Union has the General Data Protection Regulation (GDPR), the United States has the Gramm-Leach-Bliley Act and the Health Insurance Portability and Accountability Act, China has the Information Security Technology Personal Data Security Specification, Canada has the Personal Information Protection and Electronic Documents Act, Singapore has the Personal Data Protection Act 2012, South Africa has the Protection of Personal Information Act, and so on. Further, some jurisdictions take a prescriptive approach to the determination of what data constitutes PII (i.e., only carefully defined combinations of data are PII), whereas other jurisdictions take a principled approach to the determination of what data constitutes PII (i.e., the context of the use of the data must always be considered). Still further, control requirements for PII differ by jurisdiction. Because of the different regulatory regimes, different definitions for when and what types of data are considered PII, and the different PII control requirements, compliance in the use of PII within a firm with an international scope of business can be a significant challenge. PII can be defined as including any data that could potentially identify a specific individual and/or any data that could be used for de-anonymizing anonymous data. PII, which can also be referred to as "personal information," is defined by the GDPR as any information relating to an identified or identifiable natural person. In addition to the complexity inherent in complying with the use of PII across all of these different regulatory regimes, international firms must also be prepared to respond to audits in these different jurisdictions and comply with additional requirements set forth by the different regulatory regimes, such as the right for an individual to request erasure of their PII as set forth in GDPR Art. 17.

Accordingly, the present disclosure describes a system for tracking PII and related data that is utilized by the firm's computer assets for compliance with various regulatory regimes. "Computer assets" or "assets" can be generally defined as computer systems, databases, and other systems that process, store, or otherwise utilize data, including PII. Assets can be associated with the firm implementing the system, vendors of the firm, or other entities. In one implementation, a system can query (e.g., via a questionnaire or a similar format) employees, consultants, or other individuals associated with a firm that have knowledge with particular systems, databases, services, and other assets of the firm, supported with contextual assistance, to gather information pertaining to the types of data being processed by the firm's assets and classify the information provided by the individuals using a rules-based algorithm to identify assets that are utilizing PII, determine whether the PII is sensitive, determine the level of security required in managing the PII, and then record the appropriate security level and/or data controls to be applied to the computer asset (e.g., by the firm's IT personnel). For example, the presently described PII tracking system can query the system owner for a particular firm asset and have the system administrator complete a form indicating the number and types of data elements utilized by the system that the system administrator is responsible for. Further, the system can be supported by monitoring systems and/or feeds of data being utilized by some or all of the firm's assets to identify the potential use of PII by the firm's assets and provide corresponding contextual suggestions to the individuals being queried to enhance answer accuracy. Once in receipt of the answers from a queried individual, the system can apply a series of rules that determine if the asset is processing PII, if the PII is sensitive, if the PII and/or asset requires enhanced data controls, and the information sensitivity of the PII being processed (e.g., highly restricted, confidential, internal use only, or public), taking into consideration not only the types of data being processed by the asset, but also the type of individuals for which each data element is being processed. The system can then cause the appropriate data controls to be applied to the computer asset, either by directly causing the computer asset to implement the data controls or flagging the computer asset so that a secondary system or an IT team can then implement the data controls for the computer asset.

Figure 1:
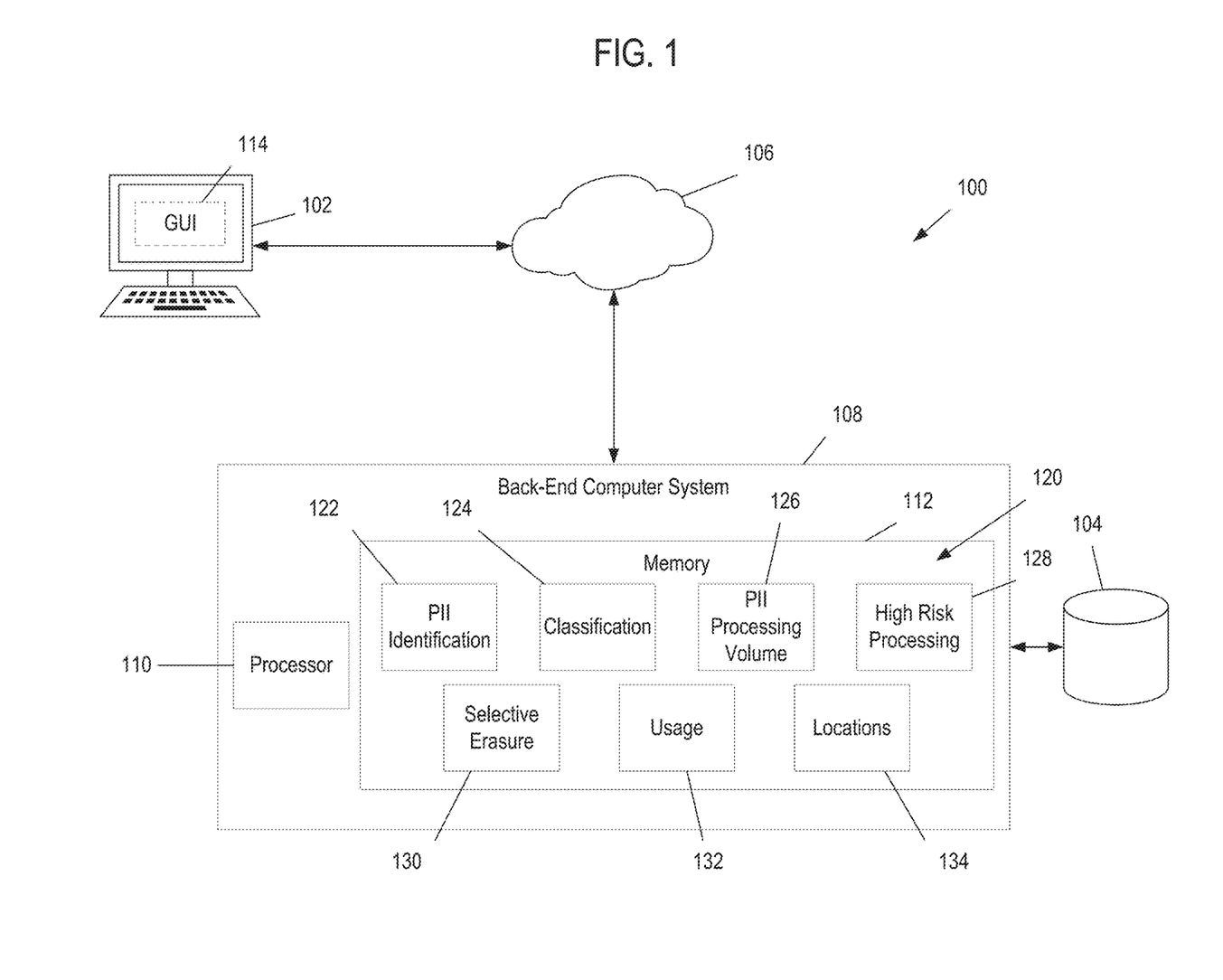
FIG. 1 illustrates a block diagram of a system for tracking PII, in accordance with at least one aspect of the present disclosure.

For example, FIG. 1 illustrates a block diagram of a system 100 for tracking PII. The system 100 can include, be incorporated into, or be communicably coupled to a firm's internal system(s) and/or network(s). In one aspect, the system 100 can include a back-end computer system 108 to which a client 102 (e.g., a personal computer, laptop, or mobile device) is communicably connectable via a communication network 106 (e.g., an enterprise network, the Internet, and/or a LAN). The back-end computer system 108 can include a processor 110 coupled to memory 112 such that the processor 110 is able to execute instructions stored in the memory 112 to cause the back-end computer system 108 to perform various tasks. The back-end computer system 108 can further include various software modules 120 stored in the memory 112 that are individually or collectively executable to perform a process or step(s) thereof to track the use of PII within a firm. The back-end computer system 108 can include or be embodied as a web server(s), a database server(s), an application server(s), and/or various other computer systems. The back-end computer system 108 can further include or be connected to a database(s) 104 that can store various data elements utilized by the firm's asset, as well as data indicating whether an asset is utilizing PII, the sensitivity of the data utilized by the asset, any enhanced data controls that are required to be utilized in connection with the asset, and so on, as described in fuller detail below. The client 102 can display or provide a user interface, such as a GUI 114, for receiving commands from a user, relaying information to the user, or otherwise interacting with the back-end computer system 108. The GUI 114 can be controlled or updated according to commands received by the client 102 from the back-end computer system 108. The GUI 114 can include a web application accessed via a web browser or an app of the client 102, for example. In aspects where the GUI 114 includes a web application, the back-end computer system 108 can accordingly include an application server on which the web application is run.

In one implementation, users can access the back-end computer system 108 via a client 102. Upon the client 102 establishing a connection with the back-end computer system 108, the back-end computer system 108 can then cause the client 102 to display the GUI 114. The GUI 114 can then allow the user to input the data elements that the asset utilizes. The user would have knowledge of the data elements utilized by the asset because, in one aspect, the user would have a position within the firm where they were assigned to or otherwise associated with the asset for which the back-end computer system 108 is querying the user. In various implementations, users can be periodically (e.g., annually) prompted to log into the back-end computer system 108 and identify or update the data elements being utilized by the asset or assets that are assigned to him or her. An asset can be considered to "utilize" PII when it directly or indirectly processes PII during the execution thereof or stores PII. For example, a client account information database asset could store a variety of data that could constitute PII, including clients' names and addresses. As another example, a financial transaction computer system asset could process a variety of data that could constitute PII during the execution of money transfers and other financial transactions, including clients' bank account information. Accordingly, the software modules 120 stored in the memory 112 can be provided, in part, to retrieve data from external systems (e.g., the database 104), receive inputs from users, update or track the use of PII within the system 100, generate reports regarding the use of PII within the system 100, and so on. In one aspect, the software modules 120 can include a PII identification module 122, a classification module 124, a PII processing volume module 126, a high-risk processing module 128, a selective erasure module 130, a usage module 132, and a locations module 134, the function of each of which will be described in greater detail below. The software modules 120 may be implemented and/or embodied as software instructions stored in a program on the memory 112 and that are executed by the processor 110. The back-end computer system 108 can be programmed to control and/or interact with the GUI 114 displayed by the client via an application-programming interface 109 (FIG. 2), for example.

Figure 2:
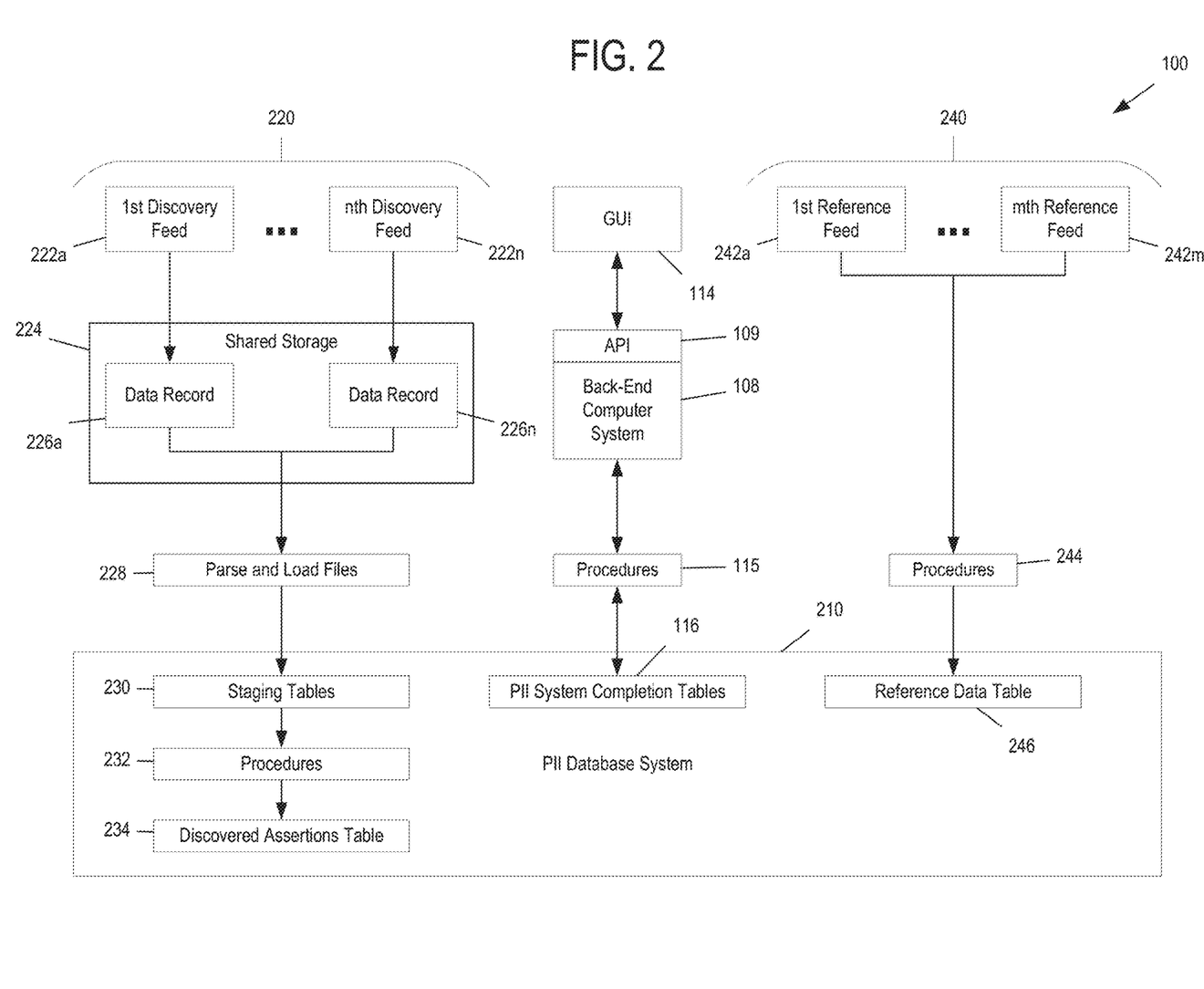
FIG. 2 illustrates a block diagram of a PII tracking system, in accordance with at least one aspect of the present disclosure.

In one aspect, the back-end computer system 108 can be programmed to preemptively identify and retrieve PII that may be processed by a given asset, which can then be presented to a user for consideration. Information regarding what PII is being processed by a given asset can be provided via systems internal to the firm and/or vendors auditing their own systems or the firm's systems. For example, FIG. 2 illustrates a block diagram of a PII tracking system. In this example, the back-end computer system 108 is communicably coupled to a PII database system 210, which can include the database 104 illustrated in FIG. 1, for example. The PII database system 210 can in turn be coupled to discovery data system 220 and/or reference data system 240. The discovery data system 220 can include software tools and/or computer systems designed to scan or analyze the firm's internal systems, vendors' systems, and other such systems for data elements that could constitute PII and then transmit any relevant identified data elements to the PII database system 210. The back-end computer system 108 can further be programmed to update and/or complete PII system completion tables 116 stored by the PII database system 210 according to executed procedures 115 based on the inputs provided by the user.

In one aspect, the discovery data system 220 can include n discovery data feeds 222a-n (where n is an integer >0), which can include software tools programmed to scan databases (e.g., the database table headings) associated with the firm's assets and map database fields to data elements. In other words, the discovery data system 220 can be programmed to identify the use of data elements that could constitute PII from the firm's systems that are not necessarily programmed to automatically transmit such data to the PII database system 210. The data feeds 222a-n can extract database fields from the firm's various database systems (e.g., database column headings) associated with its assets in order to pre-emptively identify any PII data elements in use by the firm's assets. In the illustrated example, the data feeds 222a-n can provide the extracted data records 226a-n to a shared storage 224. The shared storage 224 can be programmed to execute logic 228 to parse and load the extracted data records 226a-n to the PII database system 210. The PII database system 210 stores the received records in staging tables 230, whereupon the PII database system 210 executes various programmed procedures 232 to extract the relevant data element fields from the received records and convert the relevant data element fields to the data format utilized by the PII database system 210. The discovered data elements are then stored by the PII database system 210 in association with the asset from which the data elements were extracted so that they are available for future analysis of the asset. The discovered data elements can be stored in a discovered assertions table 234 of the PII database system 210, for example.

In one aspect, the reference data system 240 can include m reference data feeds 224a—m (where m is an integer >0), which can include software tools programmed to transmit data elements that could constitute PII that are in use by the firm's systems to the PII database system 210. Each of the reference data feeds 224a—m can be processed according to programmed procedures 244 to extract and convert relevant data received from the reference data feeds 224a—m into a format suitable for storage by the PII database system 210. The received data elements can be stored in a reference data table 246, for example.

Accordingly, the PII database system 210 can store PII data elements in association with the assets controlled by the firm and/or vendors that are processing the PII. When accessed by a user via the GUI 114 provided by the back-end computer system 108, the back-end computer system 108 can retrieve the PII data elements stored within the PII database system 210 for a given asset and present them to the users for consideration. Data elements may constitute data that could potentially be utilized on its own or in combination with other data to personally identify the individual with which the data element is associated. A data element can include, for example, a first name, last name, full name, date of birth, place of birth, email address, phone number, address, state, country, zip or postal code, national or state ID number, tax ID number, driver's license number, credit card number, account number, passport number, PIN, password, security question and/or answer (e.g., mother's maiden name), group membership (e.g., trade union membership), race, ethnicity, religion, criminal background, political opinions, mental/physical health, genetic information, biometric information, face image, IP address, device ID, device fingerprint, browser cookie, or geolocation. Users can then utilize the GUI 114 to confirm, reject, or edit the suggested PII elements as necessary according to their knowledge of the asset. Further, users can also utilize the GUI 114 to supplement the PII elements suggested by the back-end computer system 108 with additional PII elements that they know the asset utilizes. Based upon users' actions in confirming, rejecting, editing, and/or adding PII elements in association with a particular asset, the back-end computer system 108 can update the PII database system 210 accordingly. The PII database system 210 can thus record the usage of PII throughout the firm and provide an audit trail for demonstrating compliance with various jurisdictions' data protection regulations.

Figure 3:
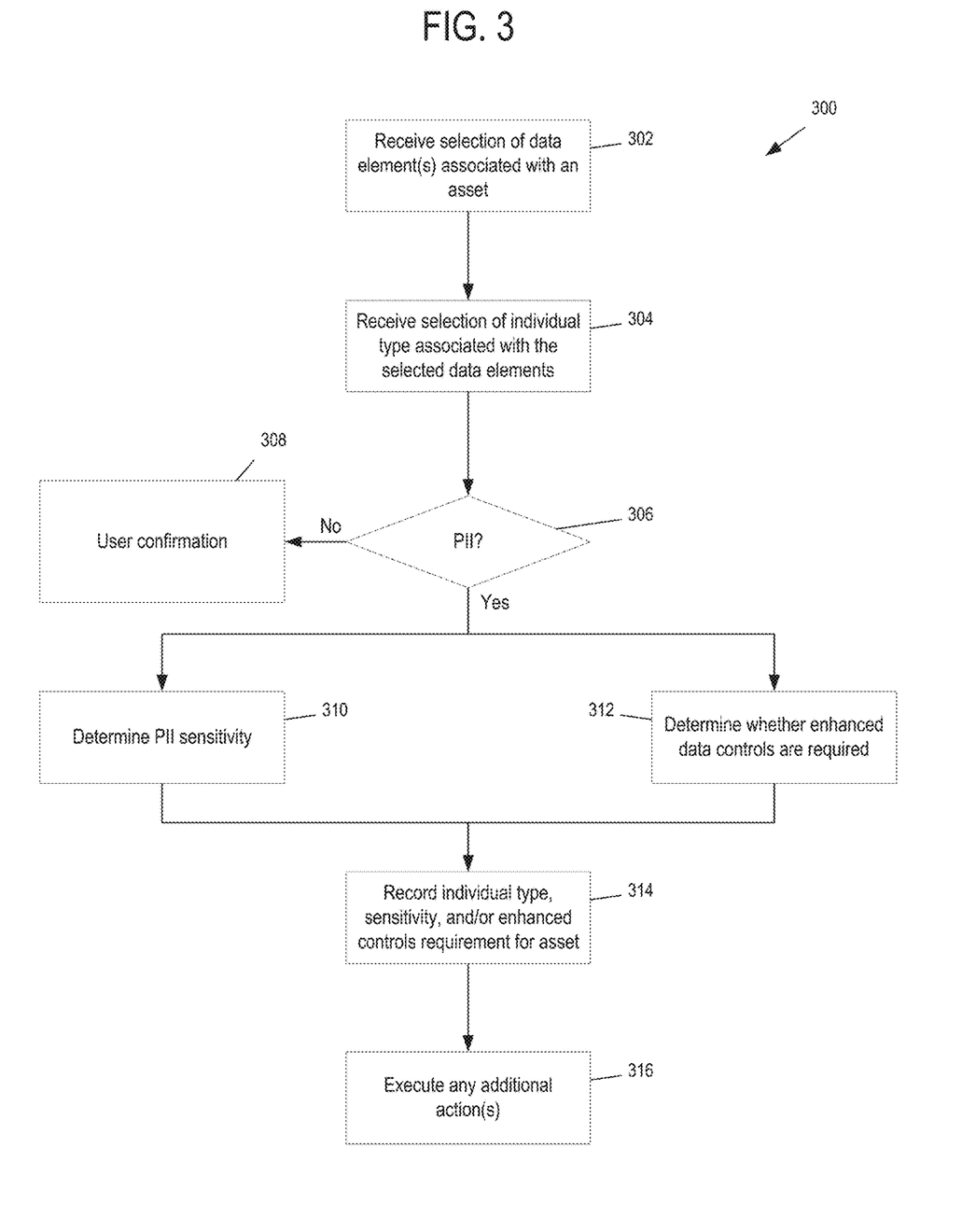
FIG. 3 illustrates a logic flow diagram of a process for tracking PII, in accordance with at least one aspect of the present disclosure.

In various aspects, the back-end computer system 108 can be programmed to execute a variety of different processes to track the use of PII within a firm. In one aspect, the back-end computer system 108 can be programmed to track the use of PII within the firm by querying individuals that manage or are otherwise responsible for the various assets utilized by the firm (e.g., system administrators) and having them complete a form indicating the types of data elements being utilized for their assigned assets. The back-end computer system 108 can then determine whether and what types of PII are being utilized in the firm based on the data input by the users and determine whether additional data controls are necessary for particular data elements based on programmed logic rulesets. The back-end computer system 108 can then track the data input by the users and/or the determinations of the logic rulesets in a database, such as the PII database system 210 in FIG. 2. Such processes allow the back-end computer system 108 to leverage user knowledge to confirm the types of data elements being utilized by each asset and automate determinations regarding how and which data should be monitored and/or protected. Because determinations regarding how and which data needs to be tracked are intended for compliance with a number of different jurisdictions' laws, the determinations are necessarily based upon a complex set of rules that are dependent upon the particular type of data being utilized, how the data is utilized, where it is utilized, for whom it is utilized, any exceptions that may exist to the relevant rule(s), and so on. These complex international PII compliance rule sets can be very challenging for human users to navigate. Automating the PII tracking process obviates the need for individual managers within the firm to make these determinations regarding PII data compliance and ensures that the firm is properly tracking the use of PII. The PII tracking system 100 also allows for various PII rules, such as those described below in connection with TABLE 4 and TABLE 5, to be adjusted and then tested (e.g., via an impact assessment test) before being broadly implemented across the firm's systems. For example, FIG. 3 illustrates a logic flow diagram of a process 300 for tracking PII executable by the back-end computer system 108. In the following description of the process 300, reference should also be made to FIGS. 1 and 2.

Figure 4:
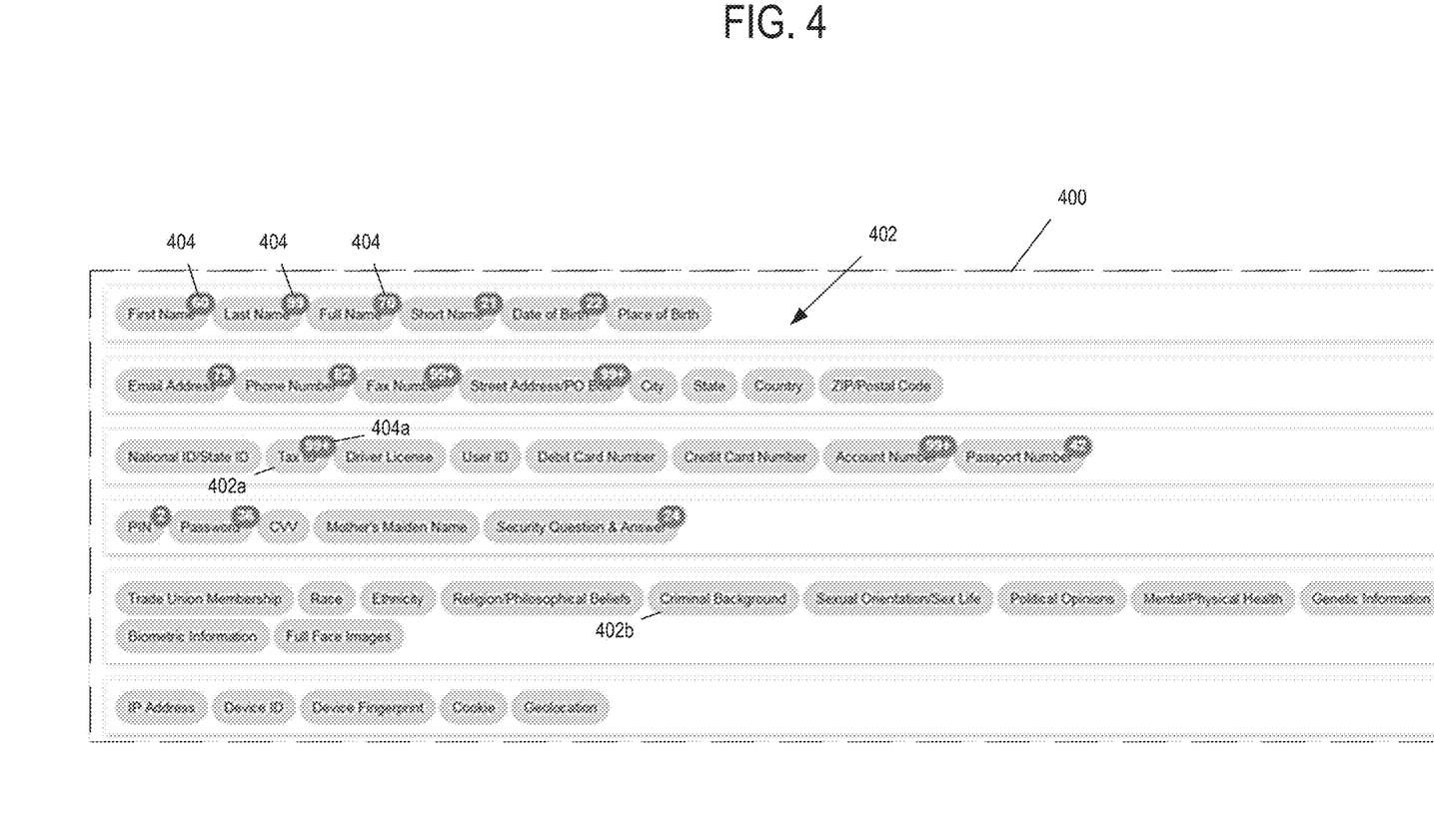
FIG. 4 illustrates a graphical user interface (GUI) for selecting data elements, in accordance with at least one aspect of the present disclosure.

Accordingly, at a first step 302, the back-end computer system 108 can receive a selection of one or more data elements associated with an asset. Such a step in the process 300 can be embodied or performed by the PII identification module 122 in FIG. 1. As noted above, the back-end computer system 108 can receive such selections through a GUI 114 provided to users that are connected to the back-end computer system 108 via a client 102. In one aspect, the back-end computer system 108 can receive the data element selection(s) for an asset by, for example, providing a data element section menu 400, such as is shown in FIG. 4, via the GUI 114. The data element section menu 400 can include one or more data element widgets 402 associated with each of the data elements that are selectable by the user. When the user has completed the data selection process, the back-end computer system 108 can record that all of the data elements types represented by data element widgets 402 that were selected by the user are utilized by the asset.

In one aspect, the back-end computer system 108 can provide suggested data elements that it has predetermined are likely to be associated with the asset. The suggested data elements can be determined according to a discovery data system 220 and/or reference data system 240, as discussed above with respect to FIG. 2, for example. In one aspect, the data element selection menu 400 can further include usage icons 404 associated with the data element widgets 402. The usage icons 404 can indicate that the particular data elements have been identified by the back-end computer system 108 as potentially being utilized by the asset and, thus, are suggested for consideration by the user. Further, the usage icons 404 can indicate the number of instances that the back-end computer system 108 determined that the associated data element was utilized. To illustrate, in the example data element selection menu 400 shown in FIG. 4, the tax ID widget 402*a* includes a usage icon 404*a*, which indicates that the back-end computer system 108 has identified more than ninety-nine potential instances of tax ID data being utilized or processed by the asset being presently evaluated. This can thus serve as an indication that the user should strongly consider whether the asset is utilizing or processing tax IDs. Conversely, the criminal background widget 402*b* does not include a usage icon 404, which indicates that the back-end computer system 108 has not identified any instances of criminal background data being utilized or processed by the asset. Although users would be instructed to consider all of the proffered data element types in determining which data element types are utilized by the asset, the usage icons 404 can streamline the data element consideration process by indicating to users data elements that are likely or unlikely to be utilized by the asset based upon the various data feeds received by the back-end computer system 108 and/or the PI 1 database system 210. The data element(s) selected by the user via the data element section menu 400 can thereafter be received by the back-end computer system 108.

Figure 5:
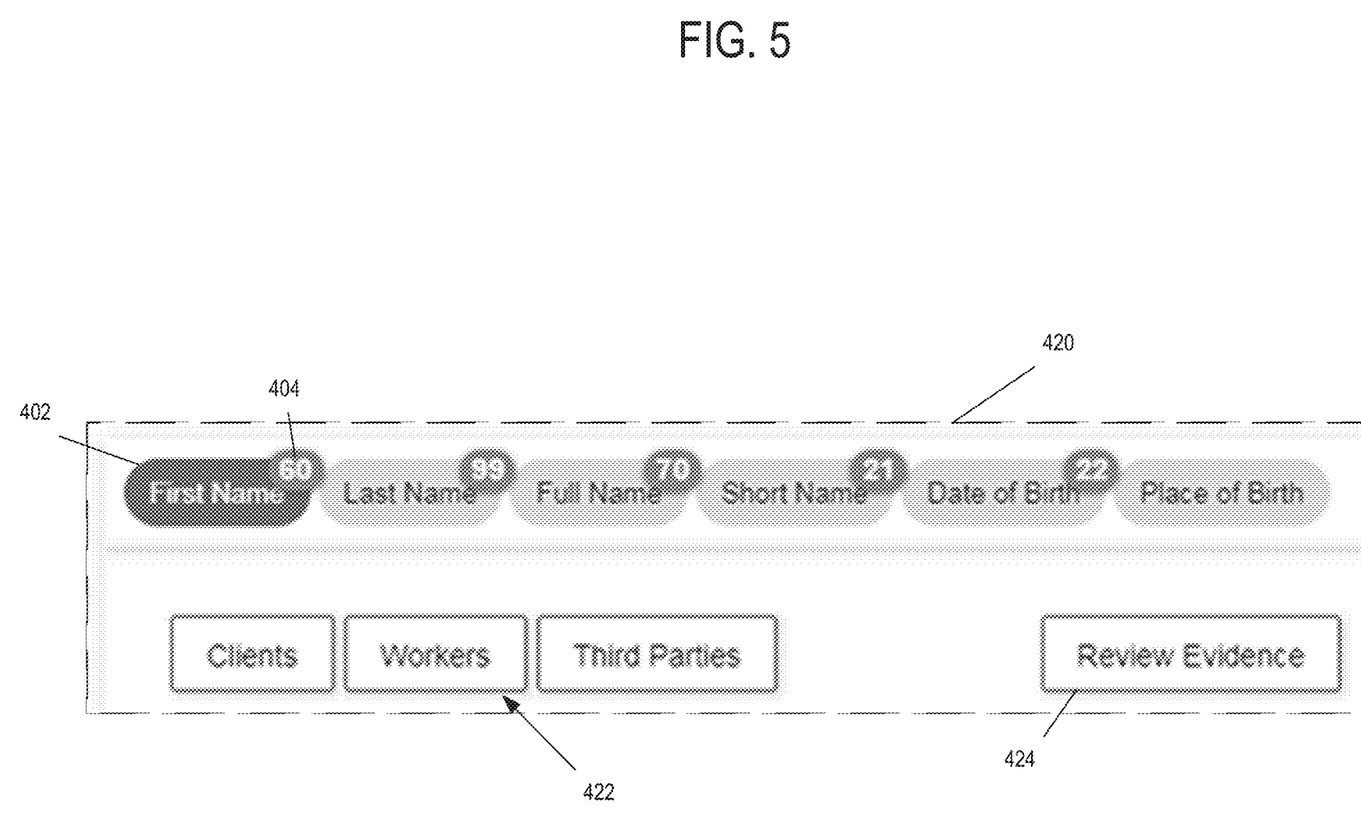
FIG. 5 illustrates a GUI for selecting an individual type for a selected data element, in accordance with at least one aspect of the present disclosure.

At a second step 304, the back-end computer system 108 can receive a selection of an individual type associated with each of the selected data elements. The individual type indicates the general class or type of individual with which the data element utilized by the asset is associated. The individual types can include, for example, clients, workers/ employees, or third parties. The individual type associated with the data elements selected for the asset can be tracked because it can influence how and what type of data controls are implemented for each data element type, whether the individuals can have the right to cause the firm to selectively delete the data, and so on. In one aspect, the back-end computer system 108 can receive the individual type selection(s) for each selected data element by, for example, providing an individual type section menu 420, such as is shown in FIG. 5, via the GUI 114. In the illustrated example, the individual type selection menu 420 includes individual type widgets 422 that are selectable by the user. The GUI 114 can be programmed to cause the individual type selection menu 420 to appear or expand upon selection of a data element widget 402 to thereby allow users to associate an individual type with the selected data element. The individual type(s) selected by the user via the individual type section menu 420 can thereafter be received by the back-end computer system 108.

In one aspect, the GUI 114 can further include a review evidence widget 424 that, when selected by a user, can cause the GUI 114 to retrieve and display the underlying data on which the number of instances indicated by the usage icon 404 for the selected data element widget 402 is based. The back-end computer system 108 can determine the number of instances in which data elements have been utilized in connection with an assert according to data received by the PII database system 210 from the discovery data system 220 and/or reference data system 240, for example.

In one aspect, the GUI 114 provided by the back-end computer system 108 can be programmed to prevent the user from advancing beyond the data element review step(s) until the user has reviewed each of the data elements for which the back-end computer system 108 has identified potential uses for PII by the asset and confirmed or denied the use of that particular data element by the asset (i.e., any data elements for which the GUI 114 has provided a usage icon 404). To illustrate, in the example shown in FIG. 4, the GUI 114 could prevent users from advancing to further steps until the user had reviewed each of the first name, last name, full name, short name, date of birth, email address, phone number, fax number, street address/PO box, tax ID, account number, passport number, PIN, password, and security question and answer data elements and confirmed or denied whether the particular asset utilizes those data elements. In this way, the back-end computer system 108 can ensure that users at least review the data elements that have been identified as potentially utilized by the asset.

At a third step 306, the back-end computer system 108 can determine whether the asset is utilizing PII based upon the combination of the data elements selected at the first step 302. In various aspects, some data elements may individually constitute PII (e.g., full name or tax ID), whereas some data elements may only constitute PII when in combination with other data elements (e.g., mother's maiden name when in combination with city of residence). In one aspect, the back-end computer system 108 can be programmed to identify a preprogrammed group, which can be referred to as a "risk group," to which each of the selected data elements belongs. The back-end computer system 108 can be further programmed to then identify whether the combination of data elements constitutes PII based upon the risk group or combinations thereof with which the asset's data elements are associated.

In one aspect, data elements can be divided into three separate risk groups. A first risk group can include data elements where there is a one-to-one relationship between the individual and the data element. In other words, a single individual is usually associated with a single value for each data element. Therefore, data elements in the first risk group may individually constitute PII since they can identify an individual. A data element categorized in the first risk group could include a national ID (e.g., the social security number for U.S. citizens and residents), for example. TABLE 1 provides examples of data elements that can be categorized into the first risk group.

TABLE 1

| PII Category | PII Data Element |
|---|---|
| Sensitive Personal Data | Biometric Information |
| Sensitive Personal Data | Genetic Information |
| Sensitive Personal Data | National/State ID |
| Government ID | Tax ID |
| Government ID | Passport Number |
| Government ID | Driver's License Number |
| Contact Details | Email Address |
| Name | Full Name |
| Name | Short Name |
| Biography | Facial Images |

A second risk group can include data elements where there is a one-to-multiple relationship between the individual and the data element. In other words, a single individual can be associated with multiple different values for each data element. Therefore, data elements in the second risk group may individually constitute PII because although there are multiple potential values for each data element and the values can be changed, each data element value can nonetheless identify an individual. A data element categorized in the second risk group could include a credit card number, for example, because an individual can have multiple different credit cards in his or her name. TABLE 2 provides examples of data elements that can be categorized into the second risk group.

TABLE 2

| PII Category | PII Data Element |
|---|---|
| Technical ID | IP Address |
| Technical ID | Device ID |
| Technical ID | Device Fingerprint |
| Technical ID | Cookie |
| Location ID | Geolocation |
| Account ID | User ID |
| Account ID | Credit Card Number |
| Account ID | Debit Card Number |
| Account ID | Account Number |
| Contact Details | Phone Number |
| Contact Details | Fax Number |
| Address | Street Address/PO Box |
| Name | First Name |
| Name | Last Name |

A third risk group can include data elements where there is a multiple-to-one relationship between the data element and the individual. In other words, multiple different individuals can be associated with a single value. Data elements in the third risk group may constitute PII when provided in various combinations with other data elements. A data element categorized in the third risk group could include a zip code of residence, for example, because there would be many different individuals residing within each zip code. TABLE 3 provides examples of data elements that can be categorized into the third risk group.

TABLE 3

| PII Category | PII Data Element |
|---|---|
| Account Authentication | PIN |
| Account Authentication | Password |
| Account Authentication | Security Question and/or Answer |
| Account Authentication | Mother's Maiden Name |
| Account Authentication | Card Verification Value |
| Address | City |
| Address | State |
| Address | Country |
| Address | Zip/Postal Code |
| Biography | Date of Birth |
| Biography | Place of Birth |
| Sensitive Personal Data | Trade Union Membership |
| Sensitive Personal Data | Race |
| Sensitive Personal Data | Ethnicity |
| Sensitive Personal Data | Religion/Philosophical Beliefs |
| Sensitive Personal Data | Sexual Orientation/Sex Life |
| Sensitive Personal Data | Political Opinions |
| Sensitive Personal Data | Criminal Background |
| Sensitive Personal Data | Mental/Physical Health |

It should be noted with respect to TABLES 1-3 that data elements can have a type (e.g., IP address), a category that can apply to multiple data element types (e.g., Technical ID), and a risk group to which the data element type and/or category is assigned (e.g., a second risk group or TABLE 2). The types, categories, and/or risk groups for the data elements that were input by the user can be utilized by the back-end computer system 108 to determine whether the input data elements constitute PII and whether any additional actions need to be taken with respect to the data (e.g., implementing enhanced data controls for the asset).

In one aspect, the back-end computer system 108 can be programmed to determine whether the selected data elements constitute PII by categorizing the selected data elements into predefined risk groups and then algorithmically analyzing the resultant combination of risk groups into which the data elements were categorized. Such a process can be embodied by the classification module 124 in FIG. 1.

For example, data elements categorized into a particular risk group can be deemed to automatically constitute PII. As another example, data elements categorized into a particular risk group when utilized by the asset or stored in combination with a particular number or type of other data elements can be deemed to constitute PII. An example algorithm for determining whether a selected data element or a combination of selected data elements constitutes PII is embodied by TABLE 4 and TABLE 5. TABLE 4 embodies an algorithm defining a set of rules that the back-end computer system 108 can be programmed to execute in response to the selection of various combinations of data elements categorized into the tables (i.e., risk groups) set forth above for an asset. TABLE 5 embodies a corresponding algorithm defining the set of rules invoked in response to the various data element combinations set forth in TABLE 4. For example, if an asset does not utilize or store any relevant data element types, then the back-end computer system 108 would determine that the asset does not utilize PII, as shown in TABLE 4 indicating that Rule 1 is utilized when there are zero data elements in each of the three risk groups and TABLE 5 indicating that the back-end computer system 108 determines that there is no PII based on the "No" in the "PII" column of TABLE 5. If an asset stores or utilizes an element categorized into the first or second risk groups, then the back-end computer system 108 would determine that the asset does utilize PII, as shown in the combination of Rules 2, 3, 8, and 9. If an asset stores or utilizes an element categorized into the third risk group, then the back-end computer system 108 may determine that the asset utilizes PII, depending upon how the third risk group data element(s) are combined with other data elements. For example, if there are three or more data elements categorized in the third risk group, then the back-end computer system 108 would determine that the asset utilizes PII, as shown in the combination of Rules 4 and 8. As another example, if there are more than two data elements categorized in the third risk group and a data element categorized in the second risk group, then the back-end computer system 108 would determine that the asset utilizes PII, as shown in the combination of Rules 5 and 8. In addition to determining whether the received data elements constitute PII based upon the combination of the risk groups that the data elements are categorized into, the back-end computer system 108 can also be programmed to determine that specific combination of data element types (as opposed to risk group types) can constitute PII. For example, if there are two data elements categorized in the third risk group and those two particular data elements are "Date of Birth" and "Place of Birth," then the back-end computer system 108 would determine that the asset utilizes PII, as shown in the combinations of Rules 7 and 8. Further, the back-end computer system 108 can also be programmed to determine that combinations of data elements categorized into particular risk group categories and particular data element types can constitute PII. For example, if there is one data element categorized into the second risk group and one or more data elements categorized into the third risk group, the back-end computer system 108 can determine that the asset utilizes PII if the data element(s) in the third risk group are labeled as "Sensitive Personal Data," include both the "Account ID" and "Account Authentication" data element types, and/or include the "Date of Birth" data element type, as shown in the combination of Rules 6 and 8. If the data element or combination of data elements categorized in the third risk group do not satisfy any of the aforementioned rules, then the back-end computer system 108 would determine that the asset does not utilize PII, as shown in Rule 10.

TABLE 4

| Number of Table 1 Elements | Number of Table 2 Elements | Number of Table 3 Elements | Rule |
|---|---|---|---|
| 0 | 0 | 0 | 1 |
| 0 | 0 | 1 | 10 |
| 0 | 0 | 2 | 7 |
| 0 | 0 | 3 | 4 |
| 0 | 1 | 0 | 9 |
| 0 | 1 | 1 | 6 |
| 0 | 1 | 2 | 5 |
| 0 | 1 | 3 | 4 |
| 0 | 2 | 0 | 3 |
| 0 | 2 | 1 | 3 |
| 0 | 2 | 2 | 3 |
| 0 | 2 | 3 | 3 |
| 1 | 0 | 0 | 2 |
| 1 | 0 | 1 | 2 |
| 1 | 0 | 2 | 2 |
| 1 | 0 | 3 | 2 |
| 1 | 1 | 0 | 2 |
| 1 | 1 | 1 | 2 |
| 1 | 1 | 2 | 2 |
| 1 | 1 | 3 | 2 |
| 1 | 2 | 0 | 2 |
| 1 | 2 | 1 | 2 |
| 1 | 2 | 2 | 2 |
| 1 | 2 | 3 | 2 |

TABLE 5

| Rule | Condition | PII | ECT |
|---|---|---|---|
| 1 | Data element count = 0 | No | No |
| 2 | Table 1 element count ≥ 1 | Go to Rule 8 | Go to Rule 8 |
| 3 | Table 2 element count ≥ 2 | | |
| 4 | Table 3 element count ≥ 3 | | |
| 5 | Table 2 element count = 1 AND Table 3 element count ≥ 2 | | |
| 6 | Table 2 element count = 1 AND Table 3 element count ≥ 1, where Table 3 element(s) are in at least one of the following combinations:<br>A  Table 3 data element category = "Sensitive Personal Data"<br>B  Table 3 data element category = "Account ID" AND Table 3 data element category = "Account Authentication"<br>C  Table 3 data element category = "Address" AND Table 3 data element category = "Biography"<br>D  Table 3 data element = "Date of Birth" | | |
| 7 | Table 3 element count = 2 in the following combination<br>A  Table 3 data element = "Date of Birth" AND Table 3 data element = "Place of Birth" | | |
| 8 | Rule 2, 3, 4, 5, 6, or 7 satisfied AND one of the following conditions is satisfied: | Go to 8A or 8B | Go to 8A or 8B |

TABLE 5-continued

| Rule | | Condition | PII | ECT |
|---|---|---|---|---|
| | A | At least one of the data elements has a sensitivity classification ≥ "Internal Use Only" | Yes | Yes |
| | B | All of the data elements have a sensitivity classification < "Internal Use Only" | Yes | No |
| 9 | | Table 2 element count = 1 | Yes | No |
| 10 | | No conditions met | No | No |

If the back-end computer system 108 determines that the selected data elements do not individually or as a combination constitute PII, then the asset does not utilize PII and the process 300 executed by the back-end computer system 108 can proceed along the NO branch to a fourth step 308. At the fourth step 308, the back-end computer system 108 can proceed to an end or final review screen that is provided to the user via the GUI 114 for the user to review and confirm the data element selections for the asset. If the back-end computer system 108 determines that the selected data elements do constitute PII, then the asset does utilize PII and the process 300 executed by the back-end computer system 108 can proceed to the subsequent steps described below.

At a fifth step 310, the back-end computer system 108 can determine the sensitivity of the PII. In one aspect, the back-end computer system 108 can be programmed to determine that the PII is sensitive if data elements from a particular category or set of categories are associated with the asset. For example, the back-end computer system 108 can be programmed to determine that the PII is sensitive if it contains data elements from the "Sensitive Personal Data" category (as shown in TABLE 3). In another aspect, the back-end computer system 108 can be programmed to calculate a sensitivity score. For example, the back-end computer system 108 can be programmed to calculate a numerical score or output a classification type assigned to the combination of received data elements (e.g., "Highly Restricted"). In yet another aspect, the back-end computer system 108 can be programmed to determine that access to the PII should be restricted based on whether a particular predefined combination or set of predefined combinations of data elements are being processed by the asset. For example, the data elements can be classified as "Highly Restricted" if particular combinations of data elements are processed by the asset.

At a sixth step 312, the back-end computer system 108 can determine whether enhanced data controls are necessary for the asset's PII. Enhanced data controls can include data masking, data encryption, restricted data access (i.e., limiting the number or type firm personnel that are able to access the asset's PII), and so on. The determination of whether enhanced data controls are necessary and the particular type of data control(s) to be applied to the data can be based on the data element(s) that are utilized by the asset that are determined to constitute the PII. An example algorithm for determining whether enhanced controls are required for the PII determined for an asset is embodied by TABLE 4 and TABLE 5. For example, if an asset does not utilize or store any data elements that would individually or collectively constitute PII, then the back-end computer system 108 can determine that enhanced data controls are not required for the data, as shown by Rule 1 in the "ECT" column of TABLE 5. If the data elements stored or utilized by the asset do constitute PII but consist solely of two data elements from the second risk group, then the back-end computer system 108 can likewise determine that enhanced controls are not required for the data, as shown by Rule 9. If the data elements stored or utilized by the asset do constitute PII and the data elements satisfy any of the conditions set forth in Rules 2-7, then the back-end computer system 108 can determine whether enhanced controls are required for the data based on whether the condition set forth in Rule 8A of TABLE 5 has been satisfied. Whether enhanced data controls are required for the asset's data and the particular type of data controls to be implemented can be stored in association with the other determinations or calculations performed by the process 300 (e.g., in a database entry of the PII database system 210). Thereafter, other systems programmed to implement the enhanced data controls can access the asset's database entry, read the type(s) of data controls to be implemented, and then proceed to implement those data controls for the asset.

At a seventh step 314, the back-end computer system 108 can record the individual type (received at the second step 304), the PII sensitivity (determined at the fifth step 310), and whether enhanced controls are required (determined at the sixth step 312) for the particular asset in a database, such as the PII database system 210. By recording this information in the database, the back-end computer system 108 creates an audit trail for compliance with jurisdictions' PII regulations. Further, the firm's other systems can be programmed to access this database and take further actions as necessary. For example, if the database entry for an asset indicates that enhanced controls are necessary for the asset's data, then a security system can read the database entry and then encrypt the asset's data using a cryptographic protocol. As another example, if the database entry for an asset indicates that the asset's data contains is sensitive, then a security system can restrict access to the asset to a select group of firm personnel.

At an eighth step 316, the back-end computer system 108 can execute a variety of different additional actions. In one aspect, the back-end computer system 108 can generate a report for the asset. The report can include a summary of the data elements utilized by the asset as input by the user, whether enhanced controls as required for the asset's data, whether the asset is utilizing sensitive data, and so on. Further, such reports can be tailored for different departments or business units within the firm. For example, the back-end computer system 108 can be programmed to generate a report containing different information for the legal department than the human resources department. In particular, a legal department report could include the legal basis according to which an asset's PII is being retained. This can be important because GDPR requires that there must be a valid legal basis for holding an individual's PII. The legal basis can be desired from a business process associated with the asset, for example, and then stored in association with the asset's PII (e.g., in the PII database system 210). Such legal basis data can also be useful for providing an audit trail for demonstrating regulatory regime compliance.

In another aspect, the back-end computer system 108 can determine the number of individuals' data that is being utilized by the asset. Such a step in the process 300 can be embodied or performed by the PII processing volume module 126 in FIG. 1. In one aspect, the back-end computer system 108 can make this determination by querying the user as to the number of individuals whose data is being processed by the asset. This query can be presented to the user as a request for a precise number of individuals or a number range of individuals for which the asset utilizes data. Establishing the number of individuals that are associated with the data being utilized by the asset is beneficial because some regulatory regimes create additional requirements on firms and/or the administration of assets based upon the scale of the data being processed. For example, GDPR Art. 37 requires that a data protection officer be designated in any situation where there is "large scale" processing of personal data. Whether an asset is considered to be undergoing large scale processing can vary according to the regulatory regime and the particular function performed by the asset (e.g., the large scale processing threshold number of individuals can vary depending upon whether the asset is processing end users' data or other individuals' data). By knowing whether large scale data processing is occurring with respect to each asset, compliance officers can ensure that the firm is in compliance with the relevant regulatory regimes. The number of individuals whose data is being utilized by the asset and/or whether the asset is considering to be large scale processing can likewise be recorded in a database, such as the PII database system 210.

In another aspect, the back-end computer system 108 can determine whether the asset is performing any high-risk data processing. Such a step in the process 300 can be embodied or performed by the high-risk processing module 128 in FIG. 1. In one aspect, the back-end computer system 108 can make this determination by querying the user as to whether the asset utilizes any of the indicated techniques. High-risk data processing can include data processing techniques that could subject the asset and/or the firm to enhanced regulatory requirements. High-risk data processing could include, for example, systemic monitoring, profiling, or automated decision making. Systemic monitoring could include the systematic and repetitive surveillance, tracking, analyzing, and/or reviewing of an individual's use of and access to the firm's systems (e.g., through closed circuit television or email surveillance). Profiling could include systemic and extensive processing of PII to evaluate, analyze, or predict an individual's performance at work, economic situation, health, personal preferences, interests, behavior, location, movements, and so on. Automated decision making could include evaluating an individual without any human intervention and where such evaluations could produce legal or other significant effects concerning the individual. High-risk processing could also include whether the asset is performing large scale processing and/or processing highly sensitive data, each of which is described above. By knowing whether high-risk data processing is occurring with respect to each asset, compliance officers can ensure that the firm is in compliance with the relevant regulatory regimes. Whether the asset is performing any high-risk processing can likewise be recorded in a database, such as the PII database system 210.

In yet another aspect, the back-end computer system 108 can determine whether the asset has selective erasure capabilities. Such a step in the process 300 can be embodied or performed by the selective erasure module 130 in FIG. 1. In one aspect, the back-end computer system 108 can make this determination by querying the user as to whether the asset has selective erasure capabilities. Selective erasure is the ability of an individual to request that their PII processed by the asset is deleted, destroyed, or otherwise made no longer capable of being processed by the asset. The ability for PII being utilized by an asset to be erased is important because some regulatory regimes (e.g., GDPR) requires that firms delete PII belonging to an individual when requested by that individual. By confirming whether selective erasure is available with respect to each asset, compliance officers can ensure that the firm is in compliance with the relevant regulatory regimes, depending upon the legal basis for the processing of the PII by the asset. Whether the selective erasure is available for the asset can likewise be recorded in a database, such as the PII database system 210.

In another aspect, the back-end computer system 108 can determine how the data is utilized by the asset. Such a step in the process 300 can be embodied or performed by the usage module 132 in FIG. 1. In one aspect, the back-end computer system 108 can make this determination by querying the user as to how the data is utilized. Data can be utilized in a number of different manners, including being stored, transmitted, and/or displayed by the asset. Further, data can be utilized in different manners for different types of individuals. Accordingly, the user can be queried as to how data is utilized for each individual type (e.g., the individual type(s) received at the second step 304). Determining how data is utilized by each of the firm's assets can be important because different regulatory regimes can subject firms to different requirements depending upon the manner in which different types of individuals' data is utilized. By confirming how data is utilized for each individual type with respect to each asset, compliance officers can ensure that the firm is in compliance with the relevant regulatory regimes. How data is utilized for each individual type by the asset can likewise be recorded in a database, such as the PII database system 210.

In another aspect, the back-end computer system 108 can determine where data is processed and/or accessed with respect to the asset. Such a step in the process 300 can be embodied or performed by the locations module 134 in FIG. 1. In one aspect, the back-end computer system 108 can make this determination by querying the user as to the locations at which the data is processed by the asset and/or accessible. In another aspect, the back-end computer system 108 can automatically determine the locations at which the asset's data is processed by retrieving the relevant records from a database storing the locations of servers (both physical and virtual), cluster services, databases, or web services, as applicable, for the asset. Further, the back-end computer system 108 can automatically determine the locations at which the asset's data is accessed by retrieving the relevant records from a database storing the firm's users that have accessed or the ability to access the asset (e.g., within a particular time period, such as a year) and providing the locations of those users. Determining where the asset's data are processed and/or accessed can be important because it can dictate which particular regulatory regimes each asset is subject to, which can in turn inform the data controls and other requirements that must be applied by the firm to the asset. By confirming where data is utilized with respect to each asset, compliance officers can ensure that the firm is in compliance with the relevant regulatory regimes. The location(s) at which the data is utilized for each individual type by the asset can likewise be recorded in a database, such as the PII database system 210.

In various aspects, the back-end computer system 108 can be programmed to execute any one or combination of the actions described above in connection with the eighth step 316. After the execution of none or any one of the processes described in connection with the eighth step 316, the back-end computer system 108 can cause the GUI 144 of the client 102 to display a final summary or review screen. Once the user confirms their selections, the back-end computer system 108 can store the relevant data entries in a database (e.g., the PII database system 210). This process 300 can then be repeated for each individual assigned to each asset controlled by the firm to record and ensure regulatory compliance across the entirety of the firm.

The systems and processes describe above in connection with FIGS. 1-3 provide a number of different technical solutions to technical problems inherent with firms' monitoring and management of clients', employees', and third parties' PII for compliance with various jurisdictions' regulations. In particular, the systems and processes automate the identification and classification of PII, which allows complex PII classification rules that are based on compliance with a number of different regulatory regimes to be applied across the entire firm in a consistent manner. Further, the systems and processes automate the determination and calculation of PII usage and PII sensitivity. Further, the systems and processes create an inventory of which PII is utilized by the firm, what assets are utilizing particular PII, and how the assets are utilizing the PII. Further, the systems and processes allow the firm's assets to be individually tailored to relevant jurisdictional controls. Still further, the systems and processes provide an audit trail demonstrating compliance with GDPR and other data protection regulations, which in turn allows the firm to accurately and efficiently reply to audits from individuals or jurisdictions' regulatory bodies.

Various aspects of the subject matter described herein are set out in the following aspects, implementations, and/or examples, which can be interchangeably combined together in various arrangements:

Accordingly, various embodiments of the present invention are directed generally to computer systems and computer-implemented method for tracking use of personally identifiable information (PII) by a computer asset of a firm. In various embodiments, the method comprises the steps of (1) receiving, by a computer system, one or more data elements associated with the computer asset; (2) receiving, by the computer system, an individual type (e.g., a client, employee, or third party) associated with the one or more data elements; (3) determining, by the computer system, whether the one or more data elements individually or as a combination constitute PII; and (4) upon determining that the one or more data elements constitute PII: (a) determining, by the computer system, whether enhanced data controls are necessary for the computer asset according to the one or more data elements that constitute the PII; (b) determining, by the computer system, a sensitivity of the PII; and (c) recording, by the computer system, the individual type, whether enhanced data controls (e.g., data masking, data encryption, and/or restricted data access) are necessary, and the sensitivity of the PII in association with the computer asset in a database communicably coupled to the computer system. The computer system may comprise a processor and memory, wherein the memory stores instructions that, when executed by the processor, cause the processor to perform the described steps.

In various implementations, the method further comprises providing, by the computer system, a report to a client communicably coupled to the computer system, the report including at least one of whether enhanced data controls are necessary for the computer asset or the sensitivity of the PII. In addition, the step of determining the sensitivity of the PII may comprise determining, by the computer system, whether any of the one or more data elements is of a data type classified as sensitive and/or calculating, by the computer system, a sensitivity score based on a combination of the one or more data elements.

In various implementations, the step of determining whether the one or more data elements individually or as a combination constitute PII may comprise: categorizing, by the computer system, each of the one or more data elements into one of a plurality of categories; wherein the plurality of categories comprises a first category in which any individual data element included therein constitutes PII and a second category in which any individual data element included therein does not constitute PII; and determining, by the computer system, whether at least one of the one or more data elements is categorized into the first category. Also, the step of determining whether the one or more data elements individually or as a combination constitute PII may comprise categorizing, by the computer system, each of the one or more data elements into one of a plurality of categories; wherein the plurality of categories comprises a first category in which any individual data element included therein constitutes PII and a second category in which any individual data element included therein does not constitute PII; and determining, by the computer system, whether a threshold number of the one or more data elements is categorized into the second category.

In various embodiments, the step of determining whether enhanced data controls are necessary for the computer asset according to the one or more data elements that constitute the PII may comprise determining, by the computer system, whether at least one of the one or more data elements that constitute the PII comprises a sensitivity classification that meets or exceeds a threshold sensitivity classification.

In still other embodiments, the method may further comprise the step of causing, by the computer system, a client to display a GUI, where the one or more data elements associated with the computer asset and the individual type associated with the one or more data elements are received via the GUI. The method may also comprise the step of providing, by the computer system, a data element set from which the one or more data elements are selectable. In that case, the method may further comprise retrieving, by the computer system, a suggested data element that was determined to be associated with the computer asset, where the provided data element set comprises the suggested data element. Also, a user may be required to confirm or reject the suggested data element as being associated with the computer asset prior to completion of the method.

Referring back to FIG. 1, the processes described herein (e.g., the process 300 of FIG. 3) can be executed by hardware, software, and/or firmware of a computer system, such as the processor 110 of the back-end computer system 108. Accordingly, the processes can be embodied as a set of computer executable instructions stored in a memory 112 of the back-end computer system 108 that, when executed by the processor 110, cause the back-end computer system 108 to perform the described steps. Further, each described step in the processes can be representative of one or multiple software modules programmed to cause the back-end computer system 108 to perform that particular step. Still further, although the processes are described as being executed by a processor 110, this is merely for brevity, and it should be understood that the described processes can also be executed across multiple processors or computers. For example, the described processes can be executed by multiple computers that are communicably connected as a distributed computer system, such as in a cloud computing architecture.

The back-end computer system 108, PII database system 210, and other systems described herein may be implemented with one or a number of network computers, such as servers, mainframes, PCs, etc. Each computer of the back-end computer system 108 and other systems may comprise one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.), nearline and/or off-line storage. The back-end computer system 108 and other systems may be programmed to perform the functions described herein with software that is stored in the primary, secondary, nearline and/or off-line data storage and executed by the processor(s) of the back-end computer system 108, PII database system 210, and other systems described herein. The computer software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

When a component is described as being "communicatively coupled" or "communicably coupled" to one or more other components, the components are coupled such that they are able to send and/or receive signals therebetween, the signals being capable of transmitting information for processing by any of the connected components or a separate component. Unless stated otherwise, components can be communicatively coupled via either wired or wireless connections. Furthermore, such connections can be configured to transmit analog signals, digital signals, or any type of signal electrically, electronically, or via any other such means. When a component is described as being "operably coupled" to one or more other components, the components are coupled such that there is a functional relationship between the components, i.e., the components are connected in a manner such that they perform the designated function.

Parts of this disclosure may be presented in terms of instructions that operate on data stored in a computer memory. An algorithm or process refers to a self-consistent sequence of steps leading to a desired result, where a "step" refers to a manipulation of physical quantities that may take the form of electrical or magnetic signals capable of being stored, transferred, combined, compared, and otherwise manipulated. These signals may be referred to as bits, values, elements, symbols, characters, terms, and/or numbers. These and similar terms may be associated with the appropriate physical quantities and are merely convenient labels applied to these quantities.

As used in any aspect herein, the term "logic" or "procedures" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

The foregoing description has set forth aspects of devices and/or processes via the use of block diagrams, flowcharts, and/or examples, which may contain one or more functions and/or operations. Each function and/or operation within such block diagrams, flowcharts, or examples can be implemented, individually and/or collectively, by a wide range of hardware, software, firmware, or virtually any combination thereof. In one aspect, several portions of the subject matter described herein, such as the controller, may be implemented via Application Specific Integrated Circuits (ASICs), Field Programmable Gate Arrays (FPGAs), digital signal processors (DSPs), Programmable Logic Devices (PLDs), circuits, registers, software components (e.g., programs, subroutines, or logic), and/or combinations of hardware and software components, logic gates, or other integrated formats. Some aspects disclosed herein, in whole or in part, can be equivalently implemented in integrated circuits, as one or more computer programs running on one or more computers (e.g., as one or more programs running on one or more computer systems), as one or more programs being executed by one or more processors (e.g., as one or more programs running on one or more microprocessors), as firmware, or as virtually any combination thereof. Designing the circuitry and/or writing the code for the software and or firmware would be well within the skill of one of skill in the art in light of this disclosure.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect.

Furthermore, the particular features, structures, or characteristics may be combined in any suitable manner in one or more aspects.

What is claimed is:

1. A computer-implemented method for tracking use of personally identifiable information (PII) by a computer asset of a firm, the method comprising:

receiving, by a computer system, identification of two or more data elements utilized by the computer asset, wherein each of the two or more data elements is a category of personal information, and wherein each of the two or more data elements corresponds to one of a plurality of risk categories;

receiving, by the computer system, identification of an individual type associated with the two or more data elements, wherein the individual type is a category of persons;

determining, by the computer system, whether the computer asset utilizes PII based on the two or more data elements individually or as a combination; and upon determining that the computer asset utilizes PII:
determining, by the computer system, a sensitivity level of the PII based on a sensitivity classification for the two or more data elements identified for the computer asset;

determining, by the computer system, whether an enhanced data control is necessary for the computer asset based on the two or more data elements identified for the computer asset and based on the sensitivity level for the PII, wherein the enhanced data control modifies access parameters to the PII from the computer asset, and wherein determining whether the enhanced data control is necessary comprises:

categorizing each of the two or data elements into its corresponding risk category; and determining whether the enhanced data control is necessary by determining an applicable rule from a set of rules, wherein a subset of rules in the set of rules corresponds to an enhanced data control, where the applicable rule is determined based on a combination of quantities of the two or more data elements categorized to each of the plurality of risk categories and based on the sensitivity classification for the two or more data elements, such that at least one rule in the set of rule is applicable to the two or more data elements upon a determination that the combination of quantities of the two or more data elements categorized to each of the plurality of risk categories is greater than zero; and recording, by the computer system, the individual type, whether enhanced data controls are necessary, and the sensitivity level of the PII in association with the computer asset in a database communicably coupled to the computer system.

2. The method of claim 1, further comprising:
providing, by the computer system, a report to a client communicably coupled to the computer system, the report including at least one of whether the enhanced data control is necessary for the computer asset or the sensitivity level of the PII.

3. The method of claim 1, wherein determining the sensitivity of the PII comprises:
determining, by the computer system, whether any of the two or more data elements is of a data type classified as sensitive.

4. The method of claim 1, wherein determining the sensitivity level of the PII comprises:
calculating, by the computer system, a sensitivity score based on a combination of the two or more data elements.

5. The method of claim 1, wherein the individual type is selected from the group consisting of a client of the firm, an employee of the firm, and a third party.

6. The method of claim 1, wherein determining whether the two or more data elements individually or as a combination constitute PII comprises:
categorizing, by the computer system, each of the two or more data elements into one of the plurality of risk categories;
wherein the plurality of risk categories comprises a first risk category in which any individual data element included therein constitutes PII and a second risk category in which any individual data element included therein does not constitute PII; and
determining, by the computer system, whether at least one of the two or more data elements is categorized into the first risk category.

7. The method of claim 1, wherein determining whether the two or more data elements individually or as a combination constitute PII comprises:
categorizing, by the computer system, each of the two or more data elements into one of the plurality of risk categories;
wherein the plurality of risk categories comprises a first risk category in which any individual data element included therein constitutes PII and a second risk category in which any individual data element included therein does not constitute PII; and
determining, by the computer system, whether a threshold number of the two or more data elements is categorized into the second risk category.

8. The method of claim 1, wherein determining whether the enhanced data control is necessary for the computer asset comprises:
determining, by the computer system, whether at least one of the two or more data elements comprises a sensitivity classification of PII that meets or exceeds a threshold sensitivity classification.

9. The method of claim 1, further comprising:
causing, by the computer system, a client to display a GUI;
wherein the two or more data elements utilized by the computer asset and the individual type associated with the two or more data elements are received via the GUI.

10. The method of claim 1, further comprising:
providing, by the computer system, a data element set from which the two or more data elements are selectable.

11. The method of claim 10, further comprising:
retrieving, by the computer system, a suggested data element that was determined to be utilized by the computer asset;
wherein the provided data element set comprises the suggested data element.

12. The method of claim 11, wherein a user is required to confirm or reject the suggested data element as being utilized by the computer asset prior to completion of the method.

13. The method of claim 1, wherein the enhanced data control comprises data masking the PII.

14. A computer system for tracking use of personally identifiable information (PII) by a computer asset of a firm, the computer system comprising:
- a processor; and
- a memory coupled to the processor, the memory storing instructions that, when executed by the processor, cause the computer system to:
  - receive identification of two or more data elements utilized by the computer asset, wherein each of the two or more data elements is a category of personal information, and wherein each of the two or more data elements corresponds to one of a plurality of risk categories;
  - receive identification of an individual type associated with the two or more data elements, wherein the individual types is a category of persons;
  - determine whether the computer asset utilizes PII based on the two or more data elements individually or as a combination; and
  - upon determining that the computer asset utilizes PII:
    - determine a sensitivity level of the PII based on a sensitivity classification for the two or more data elements identified for the computer asset;
    - determine whether enhanced data control is necessary for the computer asset based on the two or more data elements identified for the computer asset and based on the sensitivity level for the PII, wherein the enhanced data control modifies access parameters to the PII from the computer asset, and wherein the memory stores instructions that, when executed by the processor, cause the process to determine whether the enhanced data control is necessary by:
      - categorizing each of the two or data elements into its corresponding risk category; and
      - determining whether the enhanced data control is necessary by determining an applicable rule from a set of rules, wherein a subset of rules in the set of rules corresponds to an enhanced data control, where the applicable rule is determined based on a combination of quantities of the two or more data elements categorized to each of the plurality of risk categories and based on the sensitivity classification for the two or more data elements, such that at least one rule in the set of rule is applicable to the two or more data elements upon a determination that the quantities of the two or more data elements categorized to each of the plurality of risk categories is greater than zero; and
    - record the individual type, whether enhanced data control is necessary, and the sensitivity level of the PII in association with the computer asset in a database communicably coupled to the computer system.

15. The computer system of claim 14, the memory storing further instructions that, when executed by the processor, cause the computer system to:
- provide a report to a client communicably coupled to the computer system, the report including at least one of whether the enhanced data control is necessary for the computer asset or the sensitivity of the PII.

16. The computer system of claim 14, the memory storing further instructions that, when executed by the processor, cause the computer system to:
- determine whether any of the two or more data elements is of a data type classified as sensitive to determine the sensitivity of the PII comprises.

17. The computer system of claim 14, the memory storing further instructions that, when executed by the processor, cause the computer system to:
- calculate a sensitivity score based on a combination of the two or more data elements to determine the sensitivity level of the PII comprises.

18. The computer system of claim 14, wherein the individual type is selected from the group consisting of a client of the firm, an employee of the firm, and a third party.

19. The computer system of claim 14, the memory storing further instructions that, when executed by the processor, cause the computer system to:
- categorize each of the two or more data elements into one of the plurality of risk categories;
- wherein the plurality of risk categories comprises a first risk category in which any individual data element included therein constitutes PII and a second risk category in which any individual data element included therein does not constitute PII; and
- determine whether at least one of the two or more data elements is categorized into the first risk category to determine whether the two or more data elements individually or as a combination constitute PII.

20. The computer system of claim 14, the memory storing further instructions that, when executed by the processor, cause the computer system to:
- categorize each of the two or more data elements into one of the plurality of risk categories;
- wherein the plurality of risk categories comprises a first risk category in which any individual data element included therein constitutes PII and a second risk category in which any individual data element included therein does not constitute PII; and
- determine whether a threshold number of the two or more data elements is categorized into the second risk category to determine whether the two or more data elements individually or as a combination constitute PII.

21. The computer system of claim 14, the memory storing further instructions that, when executed by the processor, cause the computer system to:
- determine whether at least one of the two or more data elements comprises a sensitivity classification that meets or exceeds a threshold sensitivity classification to determine whether the enhanced data control is necessary for the computer asset according to the two or more data elements that constitute the PII.

22. The computer system of claim 14, the memory storing further instructions that, when executed by the processor, cause the computer system to:
- cause a client to display a GUI;
- wherein the two or more data elements utilized by the computer asset and the individual type associated with the two or more data elements are received via the GUI.

23. The computer system of claim 14, the memory storing further instructions that, when executed by the processor, cause the computer system to:
- provide a data element set from which the two or more data elements are selectable.

24. The computer system of claim 23, the memory storing further instructions that, when executed by the processor, cause the computer system to:
- retrieve a suggested data element that was determined to be utilized by the computer asset;

wherein the provided data element set comprises the suggested data element.

25. The computer system of claim 24, wherein a user is required to confirm or reject the suggested data element as being utilized by the computer asset.

26. The computer system of claim 14, wherein the enhanced data control comprises at least one of data masking, data encryption, or restricted data access.

27. The method of claim 1, wherein determining whether the enhanced data control is necessary comprises determining an applicable PII rule based on the combination of quantities of the two or more data elements categorized to each of the plurality of risk categories.

28. The method of claim 27, further comprising:
   receiving, by the computer system, for each of multiple computer assets of the firm:
      an identification of two or more data elements for the computer asset; and
      an identification of the individual type for the computer asset; and
   assessing, by the computer system, an impact of a new PII rule for firm based on the two or more data elements and the individual types for each of the multiple computer assets of the firm.

29. The computer system of claim 14, the memory storing further instructions that, when executed by the processor, cause the computer system to determine whether the enhanced data control is necessary by determining an applicable PII rule based on the combination of quantities of the two or more data elements categorized to each of the plurality of risk categories.

30. The computer system of claim 29, the memory storing further instructions that, when executed by the processor, cause the computer system to:
   receive, for each of multiple computer assets of the firm:
      an identification of two or more data elements for the computer asset; and
      an identification of the individual type for the computer asset; and
   assess an impact of a new PII rule for firm based on the two or more data elements and the individual types for each of the multiple computer assets of the firm.

31. The method of claim 1, wherein the enhanced data control comprises encrypting the PII.

32. The method of claim 1, wherein the enhanced data control comprises restricting access to the PII.

33. The method of claim 1, wherein:
   the plurality of risk categories comprise first, second and third risk categories;
   the first risk category corresponds to a first type of data elements that have a 1-to-1 correspondence between an individual and the first type of data elements;
   the second risk category corresponds to a second type of data elements that have a 1-to-multiple correspondence between an individual and the second type of data elements; and
   the third risk category corresponds to a third type of data elements that have a multiple-to-1 correspondence between an individual and the third type of data elements.

34. The computer system of claim 14, wherein:
   the plurality of risk categories comprise first, second and third risk categories;
   the first risk category corresponds to a first type of data elements that have a 1-to-1 correspondence between an individual and the first type of data elements;
   the second risk category corresponds to a second type of data elements that have a 1-to-multiple correspondence between an individual and the second type of data elements; and
   the third risk category corresponds to a third type of data elements that have a multiple-to-1 correspondence between an individual and the third type of data elements.

* * * * *